(12) United States Patent
Bhatia et al.

(10) Patent No.: US 12,122,124 B2
(45) Date of Patent: Oct. 22, 2024

(54) EDGE STRENGTH USING CTE MISMATCH

(71) Applicant: CORNING INCORPORATED, Corning, NY (US)

(72) Inventors: Vikram Bhatia, Painted Post, NY (US); Zhang Liu, Painted Post, NY (US); Ah-Young Park, Daejeon (KR); Yousef Kayed Qaroush, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 346 days.

(21) Appl. No.: 17/602,107

(22) PCT Filed: Mar. 30, 2020

(86) PCT No.: PCT/US2020/025687
§ 371 (c)(1),
(2) Date: Oct. 7, 2021

(87) PCT Pub. No.: WO2020/210071
PCT Pub. Date: Oct. 15, 2020

(65) Prior Publication Data
US 2022/0176678 A1    Jun. 9, 2022

Related U.S. Application Data

(60) Provisional application No. 62/832,475, filed on Apr. 11, 2019.

(51) Int. Cl.
*B32B 15/04*        (2006.01)
*B32B 7/027*        (2019.01)
(Continued)

(52) U.S. Cl.
CPC ........ *B32B 17/10036* (2013.01); *B32B 7/027* (2019.01); *B32B 17/10816* (2013.01); *B32B 2307/30* (2013.01)

(58) Field of Classification Search
CPC .................................................. B32B 17/10036
(Continued)

(56) References Cited

U.S. PATENT DOCUMENTS 2,897,632 A    8/1959    Dunipace
4,985,099 A    1/1991    Mertens et al.
(Continued)

FOREIGN PATENT DOCUMENTS

CA        2850252 A1    4/2013
CN      103764390 A     4/2014
(Continued)

OTHER PUBLICATIONS

International Search Report and Written Opinion of the International Searching Authority; PCT/US2020/025687; dated Jun. 29, 2020; 12 pages; European Patent Office.
(Continued)

*Primary Examiner* — Lauren R Colgan
(74) *Attorney, Agent, or Firm* — William M. Johnson; Payal A. Patel; Kevin M. Able

(57) ABSTRACT

A cold-formed glass laminate (100) may include a first ply (108) of 3D formed glass with a first thickness, a first strength, and a first coefficient of thermal expansion. The laminate (100) may also include a second ply (110) of 3D formed glass with a second thickness less than the first thickness, a second strength greater than the first strength, and a second coefficient of thermal expansion. The second coefficient of thermal expansion may be selected to be sufficiently higher than the first coefficient of thermal expansion to induce residual compressive stresses in the first ply (108) due to cold forming therewith. An adhesive layer (112) may be arranged between the first ply (108) and the second ply (110).

9 Claims, 8 Drawing Sheets

(51) Int. Cl.
  *B32B 17/06* (2006.01)
  *B32B 17/10* (2006.01)
(58) Field of Classification Search
  USPC .......................................................... 428/428
  See application file for complete search history.

(56) References Cited

U.S. PATENT DOCUMENTS

| | | | |
|---|---|---|---|
| 5,344,703 A | 9/1994 | Kovar et al. | |
| 5,430,257 A | 7/1995 | Lau et al. | |
| 5,591,245 A | 1/1997 | Salonen | |
| 6,015,619 A | 1/2000 | Schnabel et al. | |
| 9,616,641 B2* | 4/2017 | Cleary | B32B 17/10091 |
| 9,670,714 B2 | 6/2017 | Berard et al. | |
| 9,919,496 B2* | 3/2018 | Michetti | C03B 23/0258 |
| 9,963,374 B2* | 5/2018 | Jouanno | C03B 27/012 |
| 10,035,331 B2* | 7/2018 | Cleary | B32B 17/10119 |
| 10,175,802 B2* | 1/2019 | Boggs | B32B 17/06 |
| 10,307,992 B2* | 6/2019 | Lestringant | B32B 17/10036 |
| 10,343,378 B2* | 7/2019 | Lestringant | B32B 17/10036 |
| 10,665,795 B2* | 5/2020 | Okada | H10K 50/8426 |
| 10,800,143 B2* | 10/2020 | Cleary | B32B 27/06 |
| 10,981,357 B2* | 4/2021 | Peck | C03C 3/093 |
| 11,027,525 B2* | 6/2021 | Oh | C03C 3/085 |
| 11,034,135 B2* | 6/2021 | Oh | B32B 37/12 |
| 11,097,513 B2* | 8/2021 | Giron | B32B 17/1055 |
| 11,192,341 B2* | 12/2021 | Gier | B32B 37/182 |
| 11,261,119 B2* | 3/2022 | Bhatia | B32B 17/10761 |
| 11,872,787 B2* | 1/2024 | Couillard | B32B 17/10467 |
| 2006/0127679 A1* | 6/2006 | Gulati | C03B 17/02 |
| | | | 428/428 |
| 2012/0328843 A1* | 12/2012 | Cleary | C03C 3/095 |
| | | | 428/213 |
| 2013/0295357 A1* | 11/2013 | Cleary | B32B 17/10036 |
| | | | 428/215 |
| 2014/0087159 A1* | 3/2014 | Cleary | C03C 3/095 |
| | | | 428/339 |
| 2014/0127857 A1* | 5/2014 | Chen | H01L 24/19 |
| | | | 428/428 |
| 2015/0210583 A1* | 7/2015 | Amosov | C03C 1/00 |
| | | | 65/53 |
| 2015/0258750 A1* | 9/2015 | Kang | B32B 27/308 |
| | | | 264/261 |
| 2016/0193812 A1* | 7/2016 | Couillard | B32B 7/027 |
| | | | 156/60 |
| 2016/0207290 A1* | 7/2016 | Cleary | B32B 17/10146 |
| 2016/0280591 A1* | 9/2016 | Cleary | B32B 17/10137 |
| 2017/0008377 A1* | 1/2017 | Fisher | B32B 17/10816 |
| 2017/0057205 A1* | 3/2017 | Notsu | B32B 17/1055 |
| 2017/0197384 A1* | 7/2017 | Finkeldey | C03C 3/091 |
| 2017/0197870 A1 | 7/2017 | Finkeldey et al. | |
| 2017/0297308 A1* | 10/2017 | Golyatin | C03B 17/02 |
| 2018/0154615 A1* | 6/2018 | Dohn | B32B 17/06 |
| 2018/0237326 A1* | 8/2018 | Fredholm | C03B 23/025 |
| 2018/0281567 A1 | 10/2018 | Fisher et al. | |
| 2018/0326704 A1* | 11/2018 | Harris | C03C 17/02 |
| 2018/0370194 A1* | 12/2018 | Claireaux | B32B 17/10119 |
| 2019/0012032 A1* | 1/2019 | Brandao Salgado | |
| | | | G06F 3/0412 |
| 2019/0054717 A1* | 2/2019 | Cleary | B32B 17/10036 |
| 2019/0161402 A1* | 5/2019 | Harris | C03C 21/002 |
| 2019/0248124 A1* | 8/2019 | Cleary | B32B 17/06 |

FOREIGN PATENT DOCUMENTS

| | | |
|---|---|---|
| CN | 105683118 A | 6/2016 |
| CN | 107848265 A | 3/2018 |
| CN | 108698922 A | 10/2018 |
| EP | 3038990 A1 | 7/2016 |
| EP | 3100854 A1 | 12/2016 |
| EP | 3242800 A2 | 11/2017 |
| JP | 2017-145190 A | 8/2017 |
| KR | 10-2017-0102537 A | 9/2017 |
| WO | 93/14038 A1 | 7/1993 |
| WO | 2006/110145 A1 | 10/2006 |
| WO | 2015/031148 A1 | 3/2015 |
| WO | 2015/092385 A1 | 6/2015 |
| WO | 2016/112059 A2 | 7/2016 |
| WO | 2017/023673 A1 | 2/2017 |

OTHER PUBLICATIONS

Chinese Patent Application No. 202080037655.X, Office Action dated Nov. 3, 2022, 5 pages (English translation only), Chinese Patent Office.

\* cited by examiner

Mat 2 Expands More than Mat 1

Mat 2 Shrinks More than Mat 1

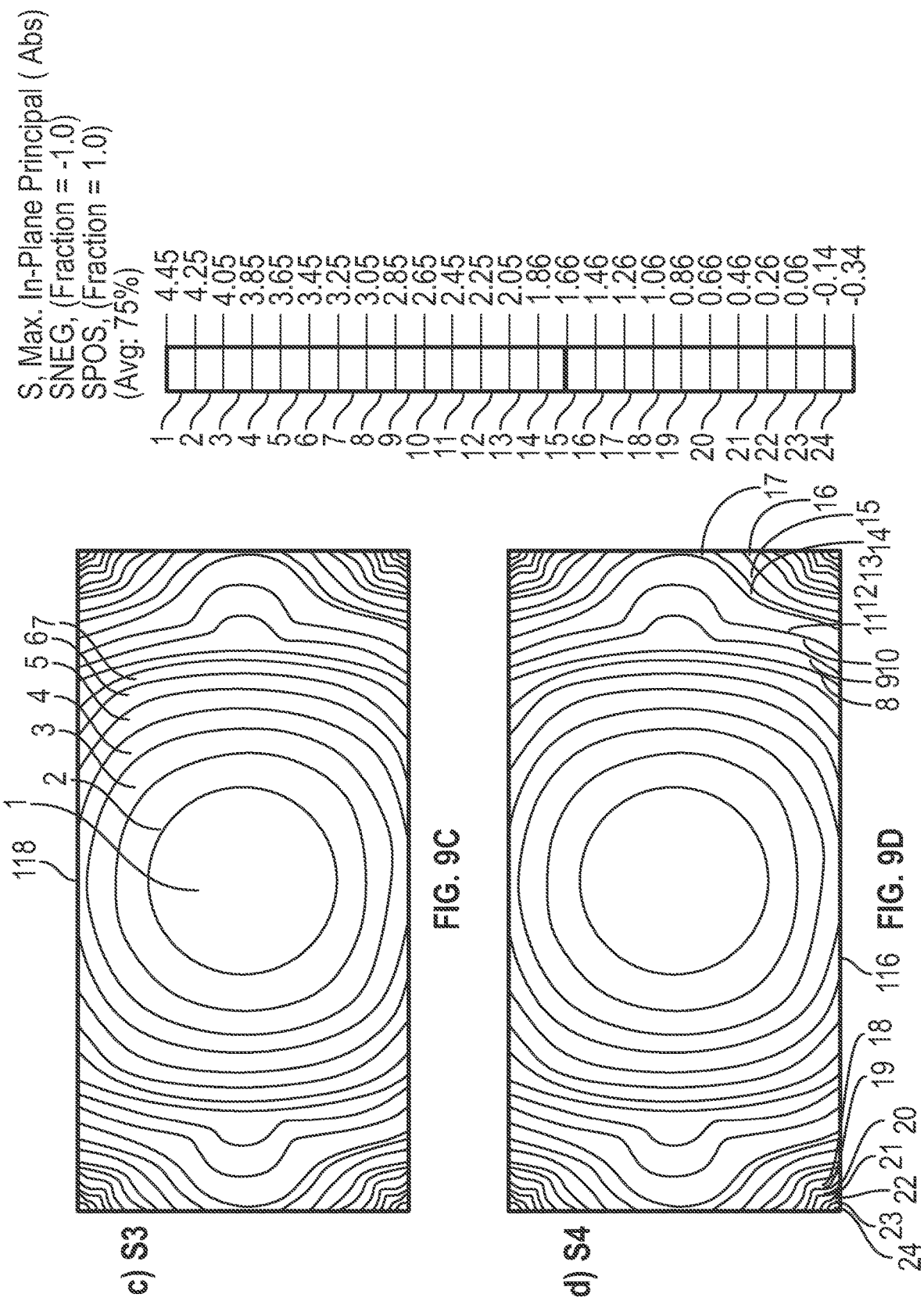

EDGE STRENGTH USING CTE MISMATCH

CROSS-REFERENCE TO RELATED APPLICATIONS

This application is a national stage application under 35 U.S.C. § 371 of International Application No. PCT/US2020/025687, filed on Mar. 30, 2020, which claims the benefit of priority under 35 U.S.C. § 119 of U.S. Provisional Application Ser. No. 62/832,475 filed on Apr. 11, 2019 the content of which are relied upon and incorporated herein by reference in their entirety.

TECHNOLOGICAL FIELD

The present application relates to glass lamination and laminates. More particularly, the present application relates to glass lamination and laminates with improved residual edge stresses. Still more particularly, the present application relates to glass lamination and laminates with plies selected to have mismatched coefficients of thermal expansion such that cold forming results in compressive residual edge stresses.

BACKGROUND

The background description provided herein is intended to generally present the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Automotive industries and other industries may utilize glass for windows, doors, side lights, and other portions of a system that are desired to be transparent or semi-transparent, for example. In the case of the automotive industry, glass may be used for glazing such as windshields, windows, sun roofs, moon roofs, and/or other portions of the vehicle. In many cases, these glass portions are laminated glass having two or more plies of glass laminated together with an adhesive.

Prior to lamination, the plies of the laminated glass may include flat or otherwise two-dimensional (2D) plies of glass, or arced, curved, or otherwise three-dimensional (3D) plies of glass may be used. In some cases, one of the plies may be substantially 2D and the other ply may be 3D. In the case of a ply of material being 3D formed, the 3D formed ply may have been cast as a 3D formed ply. Alternatively or additionally, the ply may have been cast or manufactured flat and then pre-formed (e.g., prior to lamination) using a hot forming process, a cold forming process, or another forming technique.

With the various different options for the pre-formed condition of each lamination of glass, the lamination process may involve forming the glass during and/or in addition to the lamination process. Like the ply forming process, the lamination process may be performed using a hot forming process, a cold forming process, a combination of hot forming and cold forming, or using other processes. Any and/or all of these processes may create residual stresses in the laminate and the residual stresses in the laminate may be present throughout its lifetime. Where the residual stresses are tensile in nature, and in particular, where residual stresses in the edges are tensile in nature, they can lead to problems or failures of the laminate. For example, the residual stresses may have a tendency to create cracking during lamination or more long-term issues such as delamination, crack propagation, optical distortion, and breakage during shipping, installation, or operation or use.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

In one or more embodiments, a cold-formed glass laminate may include a first ply of 3D formed glass with a first thickness, a first strength, and a first coefficient of thermal expansion. The laminate may also include a second ply of 3D formed glass with a second thickness less than the first thickness, a second strength greater than the first strength, and a second coefficient of thermal expansion selected to be sufficiently higher than the first coefficient of thermal expansion to induce residual compressive stresses in the first ply due to cold forming therewith. The laminate may also include an adhesive arranged between the first ply and the second ply.

In one or more embodiments, a method of forming a glass laminate may include hot-forming a first ply of glass with a first coefficient of thermal expansion and cold-forming a second ply of glass to the first ply of glass. The second ply of glass may have a second coefficient of thermal expansion mismatched with the first coefficient of thermal expansion to induce residual compressive stresses in the peripheral edge of the first ply. Cold-forming the second ply of glass to the first ply of glass may induce the residual compressive stresses in the peripheral edge of the first ply due to the mismatch of the first and second coefficients of thermal expansion.

In one or more embodiments, a method of forming a glass laminate may include hot-forming a first ply of glass with a first coefficient of thermal expansion. The method may also include selecting a second ply of glass having a second coefficient of thermal expansion mismatched with the first coefficient of thermal expansion to induce residual compressive stresses in the peripheral edge of the first ply. The method may also include cold-forming the second ply of glass to the first ply of glass and inducing the residual compressive stresses in the peripheral edge of the first ply due to the mismatch of the first and second coefficients of thermal expansion.

While multiple embodiments are disclosed, still other embodiments of the present disclosure will become apparent to those skilled in the art from the following detailed description, which shows and describes illustrative embodiments of the present disclosure. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the present disclosure will be better understood from the following description taken in conjunction with the accompanying Figures, in which:

FIG. 9C is a stress diagram of an adhesive side surface of an inner ply of a laminate with mismatched coefficients of thermal expansion, according to one or more embodiments.

FIG. 9D is a stress diagram of an inner surface of a laminate with mismatched coefficients of thermal expansion, according to one or more embodiments.

DETAILED DESCRIPTION

The present application, in one or more embodiments, relates to a glass laminate and a method of forming the glass laminate where particular residual stresses in the laminate are compressive and, as such, help to resist cracking, delamination, or other flaws. In one or more embodiments, a glass laminate may include an outer soda lime glass ply and an inner chemically treated glass ply. The outer ply may be hot-formed to a desired shape such as that of a roof or a windshield and the inner ply may be formed and laminated to the outer ply using a cold-forming process. This process may normally create tensile stresses in the peripheral edge of the outer ply. However, the inner ply and outer ply of the laminate may have coefficients of thermal expansion particularly selected to reduce, minimize, or alleviate the tensile stresses or replace the tensile stresses with compressive stresses. As such, the laminate may have compressive residual stresses in the peripheral outer edge of the outer ply, which may cause the laminate to be more resistant to flaw development.

Figure 1:
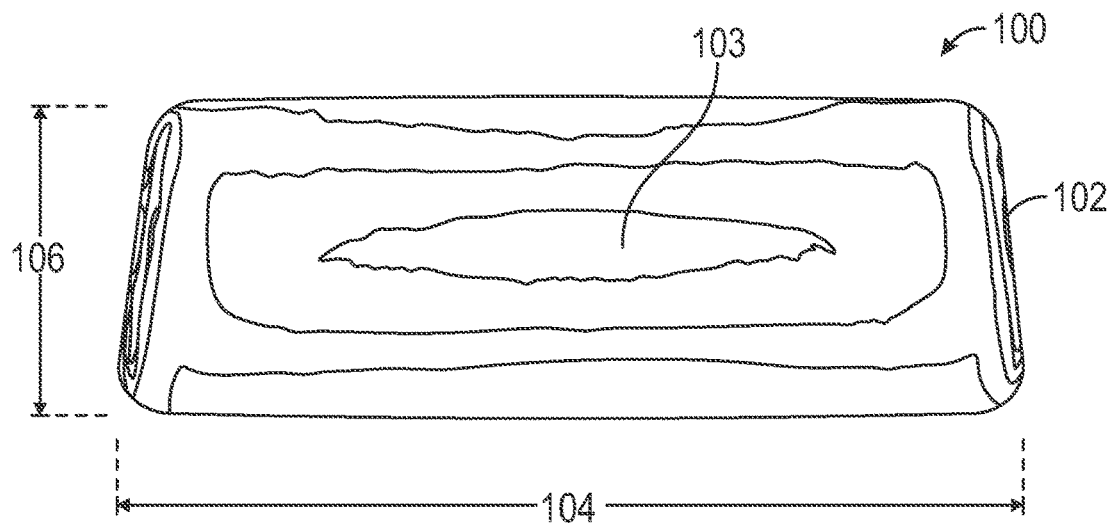
FIG. 1 is a perspective view of a laminate, according to one or more embodiments.

Referring now to FIG. 1, a perspective view of a glass laminate 100 is shown. The laminate may be particularly adapted for automotive use such as automotive glazing including, for example, a roof, a window, or a windshield. The laminate may be curved out of plane, doubly curved out of plane, or otherwise three-dimensionally (3D) shaped. The laminate may have a peripheral edge 102 surrounding a central portion 103. The peripheral edge 102 may be sized and shaped for fitting into a frame opening of a particular vehicle or a series of vehicles. In one or more embodiments, the laminate 100 may have a width 104 ranging from approximately 300 mm to approximately 1,800 mm and a length 106 ranging from approximately 230 mm to approximately 1,600 mm. The laminate 100 may have a chord height between 0 mm and 45 mm. The chord height may include the perpendicular distance between the center line chord (e.g., the chord from the top to the bottom) and the arc of the glass surface. Where the chord height is zero, the glass laminate may form a cylindrical shape (e.g., the surface may have a single curvature not double curvature). The depth of bend of the glass laminate may range from approximately 5 mm to approximately 210 mm. The depth of bend may include the depth of the laminate from the projection plane (e.g., dimension from plane defined by four corners or curved glass to deepest point of glass). The laminate may have a radius of curvature along a primary bending curvature direction ranging from approximately 40 mm to approximately 5,000 mm and a radius of curvature along a secondary bending curvature direction ranging from approximately 740 mm to approximately 32,500 mm. The Gaussian curvature which may include the product of the principal curvatures at a point may range from approximately $0.14e^7$ $mm^2$ to approximately $15e^7$ $mm^2$. The principal curvatures may include a minimum and a maximum of the normal curvatures at a point and the normal curvatures may include curvature curves on the surface lying in planes including the tangent vector at a given point.

Figure 2:
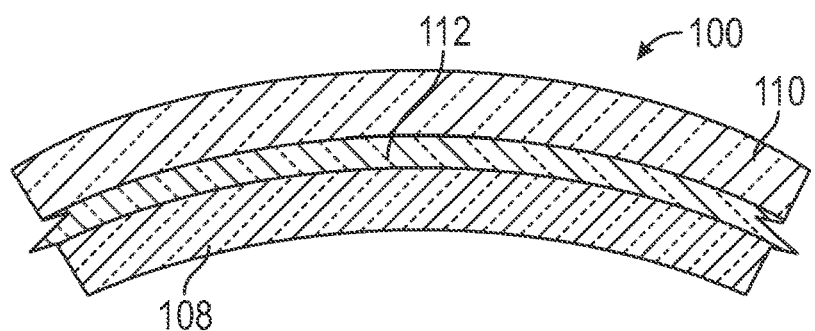
FIG. 2 is a schematic cross-sectional view of a laminate, according to one or more embodiments.

With reference to FIG. 2 and, as shown, the laminate 100 may include an inner ply 108 and an outer ply 110 secured to one another with an adhesive 112. The outer ply 110 may be a relatively thick ply of glass material and may include soda lime glass (SLG) or other glass material, such as a chemically strengthened glass, for example. The outer ply 110 may be transparent, substantially transparent, or the outer ply 110 may include textures or coatings to create tinting or semi-transparent effects for particular applications. The outer ply 110 may be considered outer because it may face outwardly toward the exterior environment when the glass laminate is installed in a vehicle, for example. The outer ply 110 may have a thickness ranging from approximately 1 mm to 4 mm or from approximately 1.5 mm to 3 mm, or the thickness may be approximately 2 mm or 2.1 mm. Still other thicknesses of the outer ply 110 of the laminate may be provided. Soda lime glass may be a relatively low strength glass and, depending on whether it has been heat treated or the type of heat treatment provided, the strength may vary relatively considerably. For example, soda lime glass may have a tensile capacity or tensile strength ranging from approximately 3-10 MPa depending on heat treatment. In any case, these tensile strengths may be considered relatively low and, as such, residual stresses, particularly residual tensile stresses, in soda lime glass can adversely affect its performance.

The inner ply 108 may be a relatively thin ply of glass material such as a chemically strengthened glass, thermally strengthened glass, or other glass material, such as non-strengthened soda lime glass, for example. In one or more embodiments, the inner ply 108 may include a mechanically strengthened glass utilizing a mismatch of the coefficient of thermal expansion between portions of the article to create a compressive stress region and a central region exhibiting a tensile stress. The inner ply 108 may be transparent, substantially transparent, or the inner ply 108 may include textures or coatings to create tinting or semi-transparent effects for particular applications. The inner ply 108 may be considered inner because it may face inwardly toward the interior cabin when the glass laminate is installed in a vehicle, for example. The inner ply 108 may have a thickness ranging from approximately 0.3 mm to 1.0 mm, or from 0.5 mm to 0.9 mm, or the inner ply may have a thickness of approximately 0.6 mm, 0.7 mm, or 0.8 mm. Still other thickness of the inner ply 108 of the laminate may be provided. Chemically strengthened glass may be a relatively high strength glass and may have a tensile capacity of approximately 90-110 MPa, or approximately 95-105 MPa, or approximately 100 MPa. The tensile strength of chemically strengthened glass may be relatively high when compared to that of soda lime glass, which may make the chemically strengthened glass suitable for use on the interior of automotive glazing where bending forces may be higher when an impact to the glass occurs.

The adhesive layer 112 may be arranged between the inner ply 108 and the outer ply 110 and may be adapted to secure the inner ply 108 to the outer ply 110. The adhesive 112 may be a transparent or a substantially transparent adhesive. For example, in one or more embodiments, the adhesive layer 112 may include one or more transparent synthetic sheets. Additionally or alternatively, the adhesive layer 112 may include a transparent or substantially transparent resin. The adhesive layer 112 may be placed between the outer ply 110 and the inner ply 108 during a lamination process and may secure the outer ply 110 to the inner ply 108 during and/or after the lamination is complete.

Figure 3:
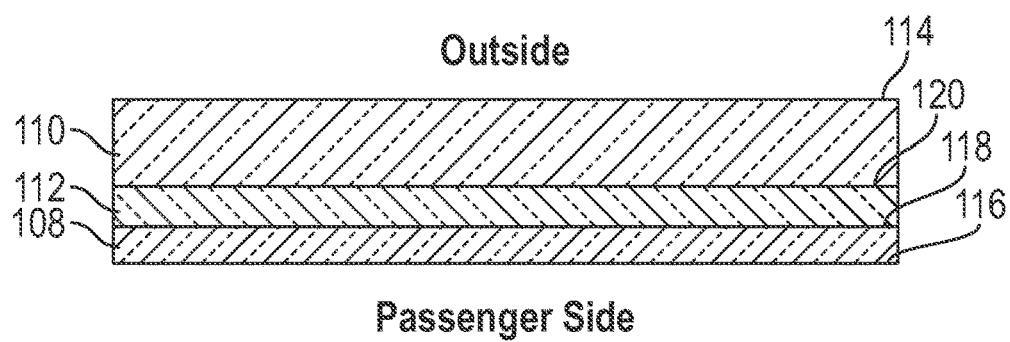
FIG. 3 is a close-up schematic cross-sectional view of a laminate identifying the several surfaces thereof, according to one or more embodiments.

For purposes of this discussion and as shown in FIG. 3, the laminate 100 may include a series of surfaces. For example, the laminate may include an outer surface 114, which may be the surface of the laminate facing the outside of a vehicle when the laminate 100 is installed. The laminate 100 may also include an inner surface 116, which may be the inside or passenger side surface when the laminate 100 is installed. Each of the inner ply 108 and the outer ply 110 may also include respective adhesive side surfaces 118, 120.

Figure 4:
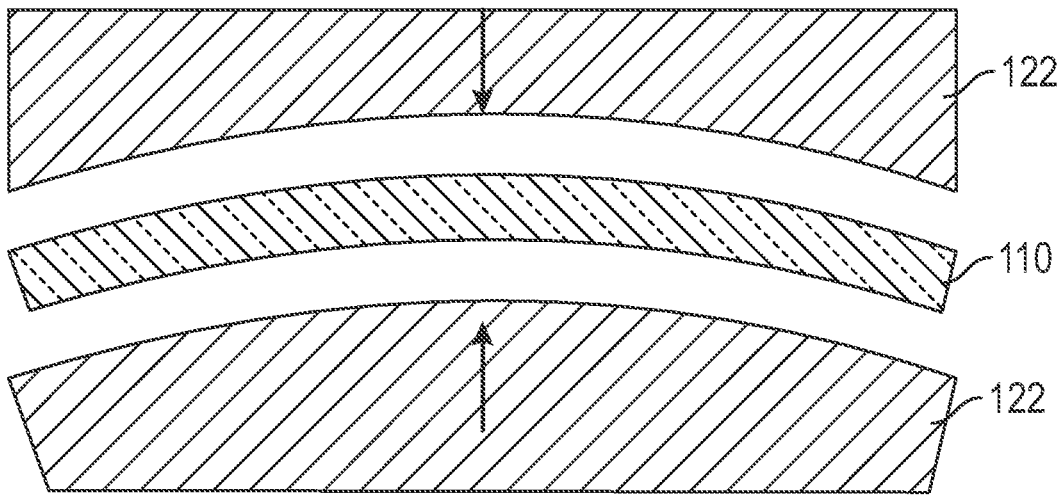
FIG. 4 is a diagram depicting a hot forming process, according to one or more embodiments.

The laminate may be formed using a combination of hot forming and cold forming processes. For example, the outer ply may be formed using a hot forming process and the inner ply may then be cold formed and laminated to the pre-formed outer ply. Referring to FIG. 4, a hot forming process may be used to pre-form the outer ply 110 of glass. The hot forming process may include heating the ply of glass 110 to its glass transition point (e.g., approximately 500° C.) and forming the glass to a desired shape by applying pressure to the surfaces of the glass. For example, a press may be used together with pre-shaped dies 122 to form the glass ply 110 to the desired shape. With the glass formed into its desired shape, the glass may be allowed to cool, dropping the temperature below the glass transition point, and, thus, securing the shape of the ply 110.

Figure 5:
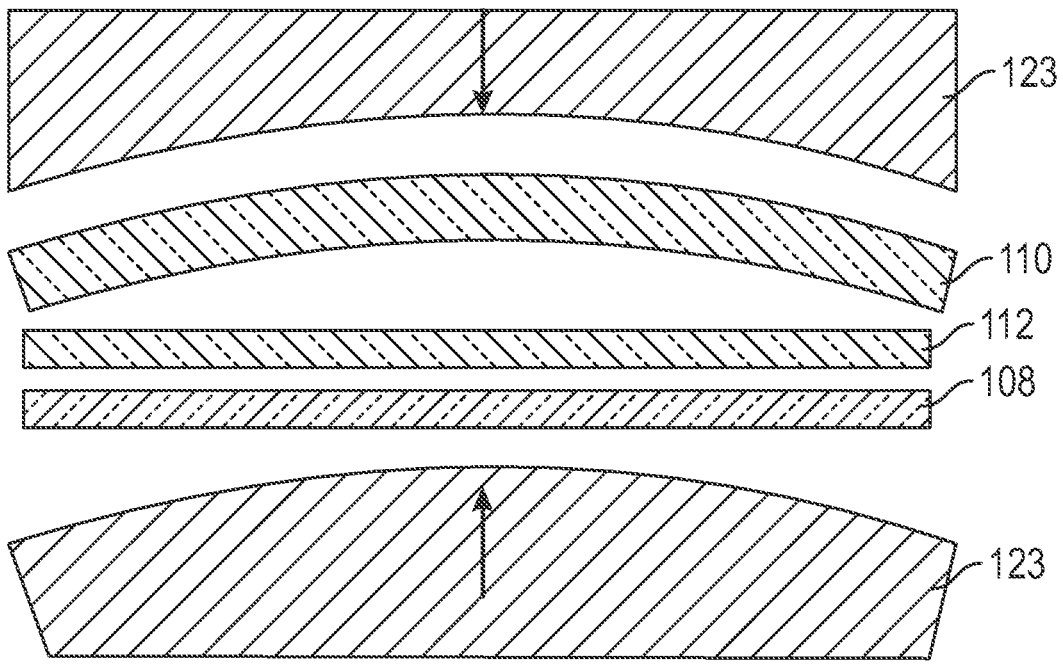
FIG. 5 is a diagram depicting a cold forming process, according to one or more embodiments.

Referring to FIG. 5, the inner ply 108 may be adhered to the outer ply 110 with an adhesive and a cold forming process may be used to both form the inner ply 108 and laminate it to the outer ply 110. That is, the cold forming process of forming auto glazing may include forming an inner ply to the shape of the outer ply and laminating it to the outer ply in a single process. The cold forming process may include arranging a substantially flat material for the inner ply adjacent to the pre-formed outer ply with an adhesive sheet or resin between the two plies. In some cases, the inner ply may be partially or fully hot-formed prior to cold forming and laminating it to the outer ply. Nonetheless, the plies and the adhesive may be heated to a cold-forming temperature of approximately 120° C. or other cold-forming temperature. Cold forming temperatures may be less than 140° C., for example, as compared to hot forming temperatures often exceeding 500° C. The cold forming process may include pressing the inner ply and adhesive against the pre-formed outer ply with a pair of dies or other pressing elements 123 shaped to resemble the pre-formed outer ply. The pressing elements 123 may be the same pressing elements as those used in the hot-forming process or separate pressing elements may be used. As such, the adhesive layer and the inner ply may be formed under pressure to conform to the shape of the outer ply and the adhesive may adhere the inner ply and outer ply together forming the laminate. After forming and/or laminating, the laminate may be cooled down from the cold forming temperature. It may be appreciated that cold forming may be a more energy efficient method of creating curved glass panels based on the elastic deformation of glass at relatively low temperatures.

During the cold forming process, residual stresses may be created in the laminated materials. The residual stresses created may be a combination of the residual stresses in the pre-laminated materials and may include additional stresses due to the cold forming process. For example, the pre-formed outer ply may have residual stresses from the hot forming process. The inner ply and the outer ply may develop internal stresses from the cold-forming/laminating process. The residual stresses in the outer ply and the internal stresses of the inner ply may interact via the adhesive and result in residual stresses in each of the inner and outer plies in the laminate form (e.g., post-formed residual stresses).

Figure 6:
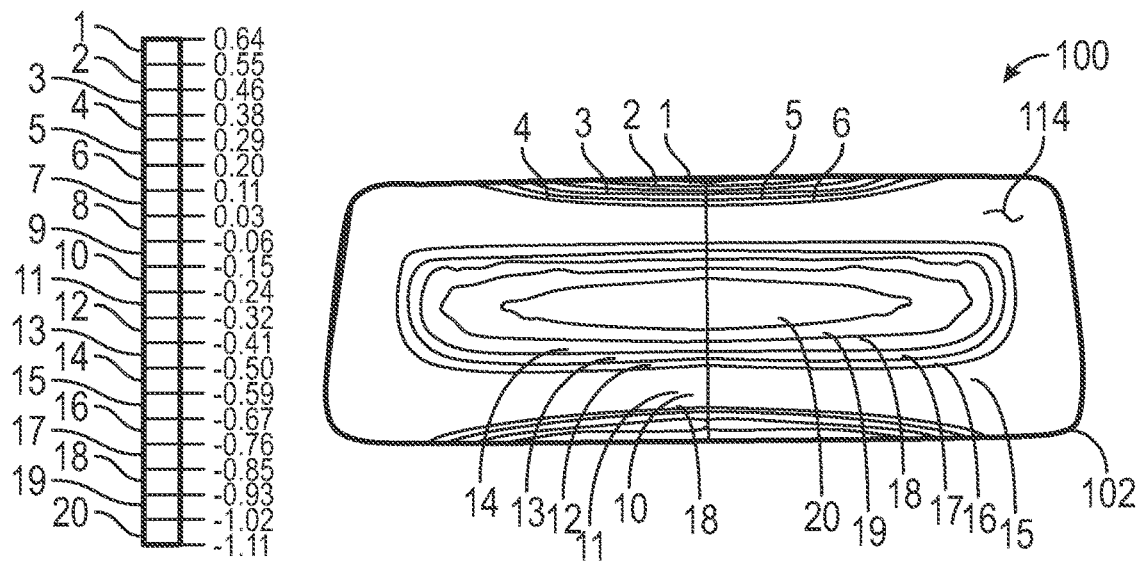
FIG. 6 is a stress diagram of a laminate after cold-forming and prior to cooling, according to one or more embodiments.

As shown in FIG. 6, and prior to cooling, the cold forming process may result in various stresses throughout the pre-formed outer ply. The various stress zones in FIGS. 6, 9A-9D, and 10-12 have been labeled to correspond to the stress zones in the list. As shown, the stresses on the outer surface 114 of the laminate 100 may include stresses ranging from approximately 1.15 MPa compression to approximately 0.75 MPa tension. Moreover, the tensile stresses may be at or near the edges of the outer ply of the laminate. Still further, and without more, cooling of the laminate 100 may cause the tensile stresses to increase and approach 3 MPa.

Particular approaches to laminate ply selection may be provided herein to reduce and/or alleviate the risks of cracking and other problems in the outer ply 110 of the laminate 100. For example, particular laminates with particular coefficients of thermal expansion may be selected to take advantage of the cooling process during cold forming to alleviate and/or reverse the stresses in the edges of the laminate 100 during cooling.

Figure 7A:
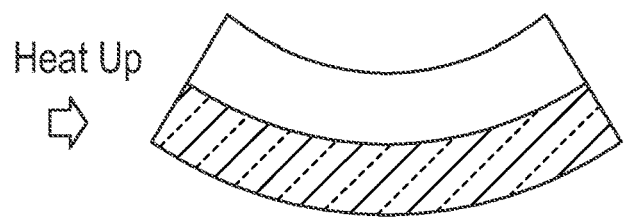
FIG. 7A is a diagram showing the potential effects of heat up on a laminate with mismatched coefficients of thermal expansion, according to one or more embodiments.
Figure 7B:
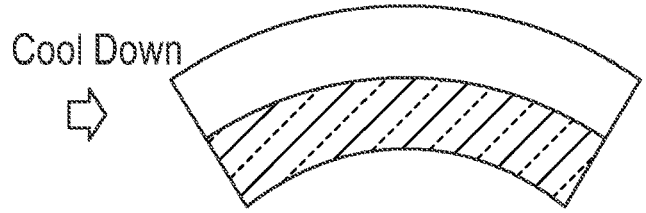
FIG. 7B is a diagram showing the potential effects of cool down on a laminate with mismatched coefficients of thermal expansion, according to one or more embodiments.

As shown in FIGS. 7A and 7B, mismatches in coefficients of thermal expansion may generally create differential movements and/or stresses in two laminated materials. Thermal expansion may be a tendency of matter to change in shape, area, and/or volume in response to a change in temperature. The degree of expansion may be characterized by a coefficient of thermal expansion (CTE). For example, the coefficient of thermal expansion may help to determine how the size of an object or material changes with temperature. In many situations, CTE mismatch is seen as a potential for problems with laminates or other combinations of materials because of the differential movements and/or internal stresses it may create. As shown in FIG. 7A, for example, where a first material (Mat 1) has a CTE of 5 ppm/° C. and a second material (Matt) has a CTE of 50 ppm/° C. the material with the higher CTE may "grow" or expand more than the material with the lower CTE when the materials are heated. Similarly, in FIG. 7B, for example, the material with the higher CTE may "shrink" or contract more than the material with the lower CTE when the materials are cooled. As shown in the figures, when there is insufficient resistance to warpage, deformations may occur due to the CTE mismatch. For example, where the material with the higher CTE is on the bottom as shown in FIG. 7A and the materials are heated, the larger expansion of the material on the bottom may cause the two materials to curl upward. In contrast, as shown in FIG. 7B, if the materials were to be cooled, the larger contraction on the bottom may cause the two materials to curl downward.

Figure 8A:
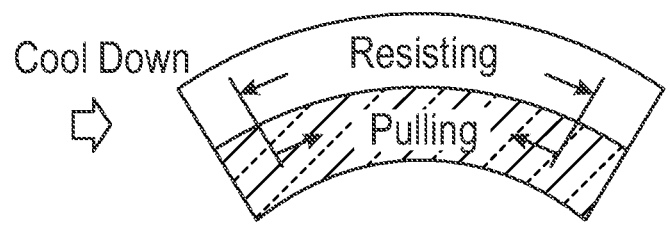
FIG. 8A is a diagram showing the internal motion tendencies during cool down of a laminate with mismatched coefficients of thermal expansion, according to one or more embodiments.
Figure 8B:
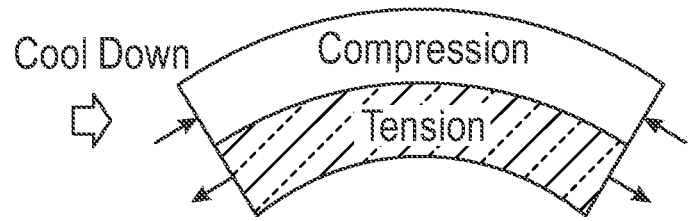
FIG. 8B is a diagram showing the internal stresses during cool down of a laminate with mismatched coefficients of thermal expansion, according to one or more embodiments.
Figures 9A, 9B:
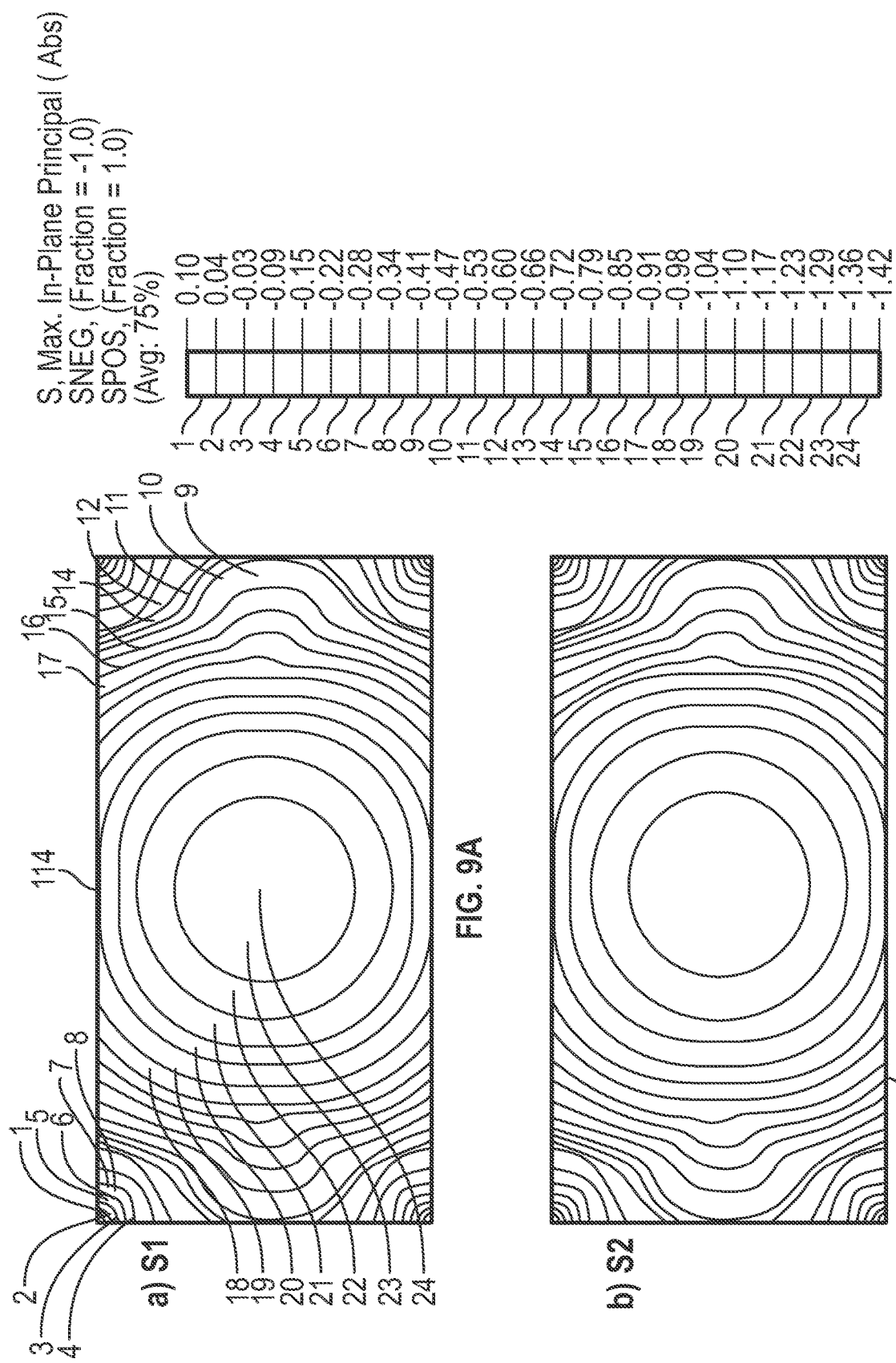
FIG. 9A is a stress diagram of an outer surface of a laminate with mismatched coefficients of thermal expansion, according to one or more embodiments.
FIG. 9B is a stress diagram of an adhesive side surface of an outer ply of a laminate with mismatched coefficients of thermal expansion, according to one or more embodiments.

One or more embodiments herein may use mismatched coefficients of thermal expansion as an advantage. That is, as shown in FIGS. 8A and 8B, differing coefficients of thermal expansion may induce internal stresses in adjoining materials. As shown in FIG. 8A, for example, and during cooling, the material with the larger CTE may shrink more than the material with the lower CTE and, as such, may pull inward toward a center of the material. The tendency of the higher-CTE material to pull may be resisted by the material with the lower CTE. The result, as shown in FIG. 8B, may be that the higher-CTE material develops internal tensile stresses and the lower-CTE material develops internal compressive stresses.

Moreover, in one or more embodiments, the material stiffnesses alone or in combination with the adhesive materials between them may be selected together with the different coefficients of thermal expansion to avoid internal stresses that may cause warpage of the materials and, as such, the curvature shown in FIGS. 7a-8b may be avoided. In one or more embodiments, modeling may be performed to select materials, material thicknesses, and coefficients of thermal expansion that avoid warpage. In one or more embodiments, the outer ply may be approximately twice as thick as the inner ply. Moreover, ratios of coefficients of thermal expansion between the inner ply and the outer ply may range from approximately 1.1 to approximately 2.5. Still other factors such as material modulus of elasticity may be considered to select materials that may resist warpage. While particular thickness ratios and ratios of CTE have been mentioned, still other ratios and relationships may be determined by calculation, modeling, or basic experimentation based on the content of this disclosure.

FIGS. 9A-9D show the stresses on the several surfaces 114, 116, 118, and 120 for a basic rectangular shape. That is, for example, where a relatively thick outer ply of soda lime glass is adhered with an adhesive layer to a relatively thin inner ply of chemically strengthened glass and the coefficients of thermal expansion are as shown in FIGS. 8A and 8B, the stresses shown in FIG. 9A-9D may result when the materials are cooled from approximately 120° C. to approximately 20° C. As shown, the outer surface 114 may develop compressive forces generally throughout its full surface area, except at the corners, and the compressive forces may range from approximately 0 to approximately 1.5 MPa. The adhesive side surface 120 of the outer ply may develop similar compressive forces. In contrast, the adhesive side surface 118 of the inner ply and the inner surface 116 may each develop tensile forces, except at the corners, and the tensile forces may range from approximately 0 to approximately 4.5 MPa.

This may be applied to the design of windshields, other types of auto glazing, or other laminates or glazing. That is, as discussed above, various stresses may result from the forming processes associated with forming laminates for these types of applications. Stresses may result from hot-forming, from cold-forming, from both, or from the lamination process. Particular coefficients of thermal expansion may be selected to counteract the effect of these processes and improve the resulting residual stresses of the laminate (e.g., the post-formed residual stresses). More particularly, CTE mismatch may be used to counteract and/or reduce or overcome the tensile stresses. That is, an inner ply with a higher CTE may be used such that the cooling process will create a tendency for the inner ply to shrink more than the outer ply. As such, the cooling process after cold forming may induce compressive stresses in the outer ply.

Figure 10:
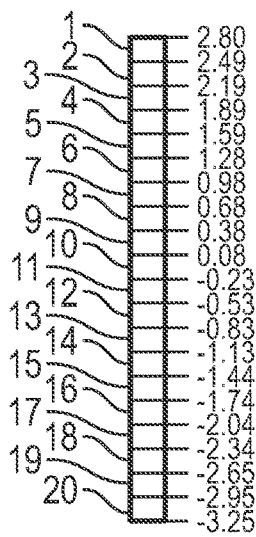
FIG. 10 is a stress diagram of a laminate after cold forming and after cooling where the laminate has particularly selected and mismatched coefficients of thermal expansion, according to one or more embodiments.
Figure 10:
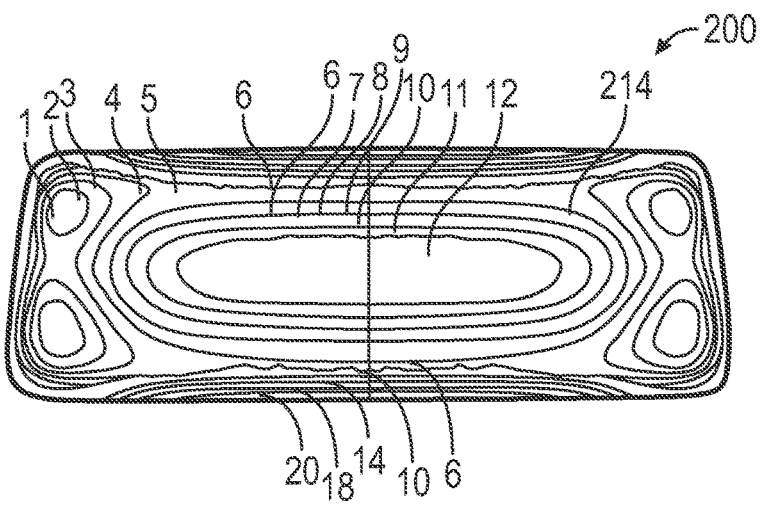

FIG. 10 shows a stress distribution on the outer surface 214 of a laminate 200 where the CTE of the inner ply is approximately 10 ppm/° C. It is to be appreciated that the CTE of the outer ply may be approximately 8.5 ppm/° C. In this particular embodiment, the thickness of the outer ply may be approximately 2.1 mm and the inner ply thickness may be approximately 0.7 mm. As shown, and with just a slightly higher CTE (e.g., 10 ppm/° C. as compared to 8.5 ppm/° C.), substantially all of the edge stresses in the laminate 200 may be compressive ranging from approximately 0.25 MPa to 3.25 MPa. Away from the edge, tensile stresses may be seen in the outer surface and may range from approximately 0 MPa to approximately 2.8 MPa.

Figure 11:
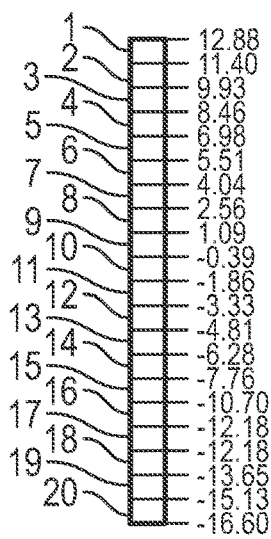
FIG. 11 is a stress diagram of a laminate after cold forming and after cooling where the laminate has particularly selected and mismatched coefficients of thermal expansion, according to one or more embodiments.
Figure 11:
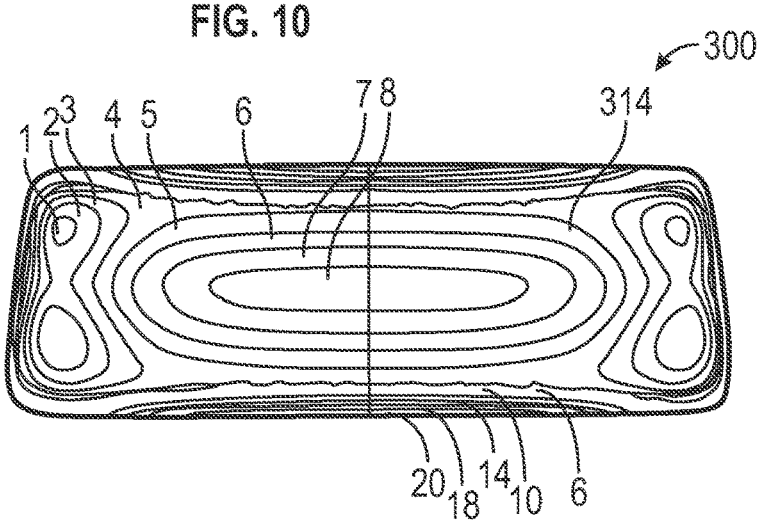

FIG. 11 shows a stress distribution on the outer surface 314 of a laminate 300 where the CTE of the inner ply is approximately 15 ppm/° C. As with laminate 200, the CTE of the outer ply of laminate 300 may be approximately 8.5 ppm/° C. Still further, and like the laminate 200, the thickness of the outer ply and the inner ply may be 2.1 mm and 0.7 mm, respectively. In this embodiment, where the inner ply CTE is approaching double the CTE of the outer ply, the edge stresses remain compressive and generally increase as compared to laminate 200. That is, the edge stresses may range from 1.5 MPa to approximately 16.5 MPa compression. Away from the edge, tensile stresses may be seen in the outer surface 314 and may range from approximately 0 MPa to approximately 12.9 MPa.

Figure 12:
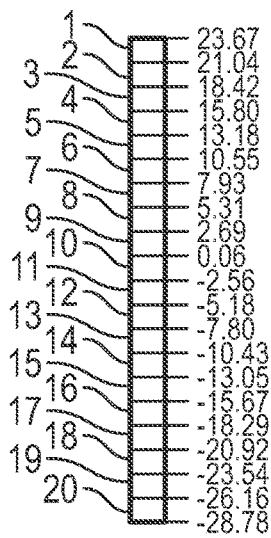
FIG. 12 is a stress diagram of a laminate after cold forming and after cooling where the laminate has particularly selected and mismatched coefficients of thermal expansion, according to one or more embodiments.
Figure 12:
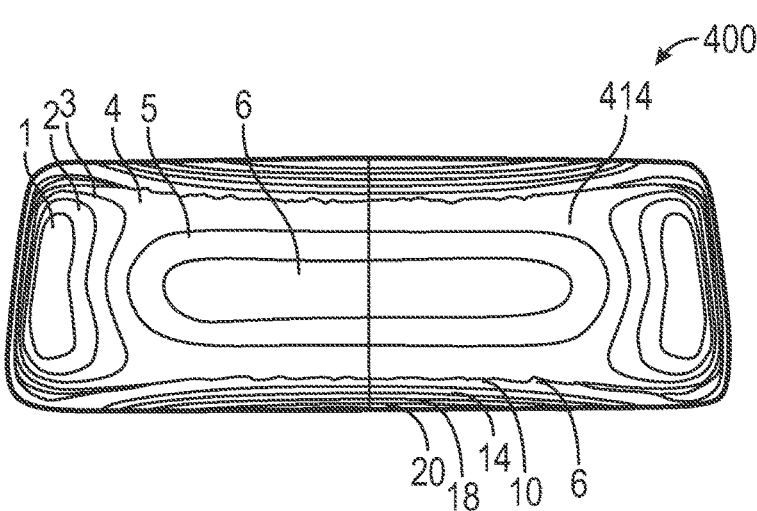

FIG. 12 shows yet another example of a stress distribution on the outer surface 414 of a laminate 400 where the CTE of the inner ply is approximately 20 ppm/° C. Like laminates 200 and 300, the laminate 400 may have an outer ply thickness of 2.1 mm, an inner ply thickness of 0.7 mm, and an outer ply CTE of 8.5 ppm/° C. As shown, with an inner ply CTE exceeding double the CTE of the outer ply, the edge stresses continue to remain compressive and increase as compared to the laminates 200 and 300. For example, the edge stresses may range from 3 MPa to approximately 29 MPa compression. Away from the edge, tensile stresses may be seen in the outer surface 414 ranging from approximately 0 MPa to approximately 23.75 MPa.

Figure 13:
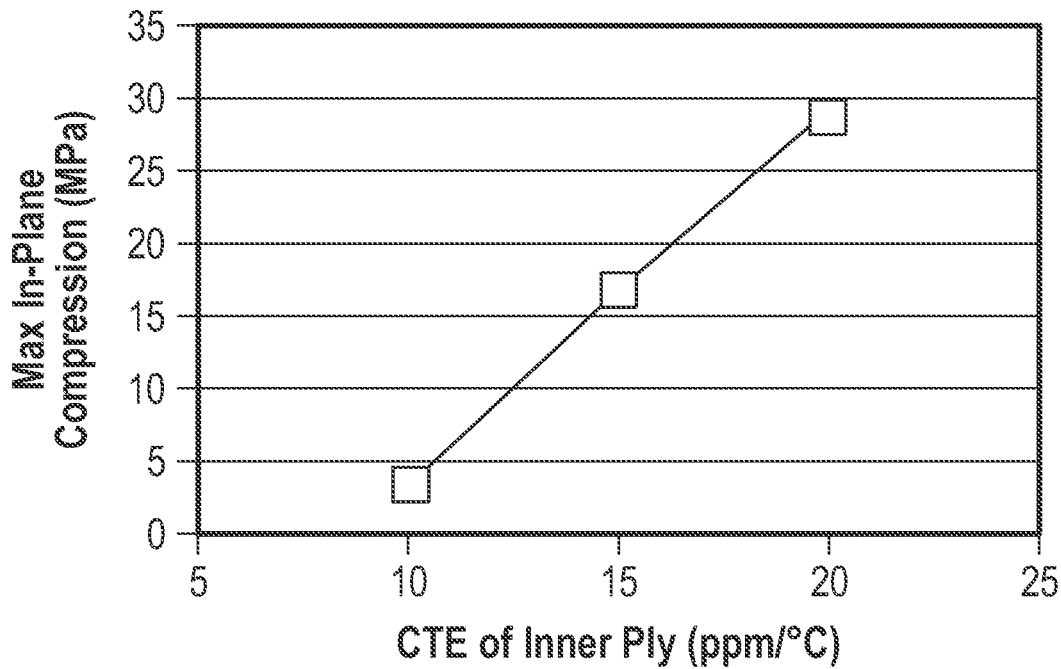
FIG. 13 is a graph of the maximum in-plane compression for an outer surface of a laminate based on cold forming with an inner laminate having varying coefficients of thermal expansion, according to one or more embodiments.
Figure 14:
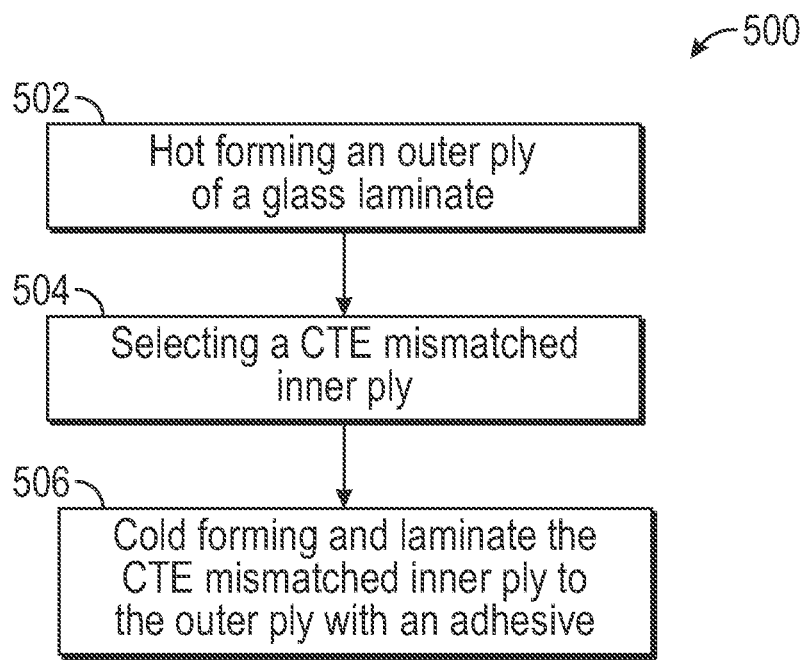
FIG. 14 is a method diagram showing a method of forming a laminate, according to one or more embodiments.

FIG. 13 shows a diagram of the maximum in plane compression in the outer ply (214, 314, and 414) for an outer ply having a CTE of approximately 8.5 ppm/° C. and the inner ply having a varying CTE (e.g., 10, 15, and 20 ppm/° C.). As shown, the maximum in plane compression in the outer ply increases substantially linearly as the CTE of the inner ply is increased. As such, selection of the CTE of the inner ply may be made with relatively high confidence in the resulting stresses in the outer ply.

A method 500 for forming a glass laminate that is resistant to breakage, cracking, crack propagation, and/or optical distortion may be provided. The method may include hot forming an outer ply of a glass laminate (502). The outer ply may be the same or similar to the outer ply described herein and, as such, may be relatively thick and relatively low in strength. The hot forming process may include heating the outer ply to a temperature meeting or exceeding the glass transition point of the outer ply and using a press with a die sized and shaped to form a desired glass shape such as a shape of a windshield or other automotive glazing. The method may also include selecting a CTE mismatched inner ply (504). The selection may be based on a desired amount of compression in the peripheral edge of the outer ply after cooling from a cold forming process. The selected inner ply of material may then be cold formed/laminated to the outer ply with an adhesive (506). The inner ply may be the same or similar to the inner ply described herein and, as such, may be relatively thin and relatively high in strength. As mentioned, however, the inner ply may have a particularly selected CTE that is mismatched from, and generally greater than, the CTE of the outer ply. The cold forming and laminating process may involve heating the inner ply of the laminate to a cold-forming temperature of less than 140° C., for example. The cold forming process may include placing the outer ply, an adhesive layer, and the inner ply in a press with a die designed to maintain the shape of the outer ply while pressing the inner ply to the outer ply and causing the inner ply to conform to the shape of the outer ply. The glass laminate may be suitable for installation into a vehicle or for other uses.

The resulting glass laminate may be more resistant to breakage during cold forming, cracking, delamination, crack propagation, optical distortion or breakage during shipping, installation, or use. That is, the compressive stresses induced during the cold forming process, and due to the CTE mismatch, may make the outer ply more stable and less susceptible to the mentioned defects.

It is to be appreciated that while the application has been described in the context of automotive glazing and, as such, has suggested the outer ply may be thicker and less strong than the thinner and stronger inner ply, the laminate may be reversed. Moreover, particular properties of the inner ply and the outer ply may be swapped as well. For example, the outer ply may be thinner than the inner ply and/or the outer ply may be stronger than the inner ply. Still other reversals and substitutions may be provided. Still further, additional plies outside the mentioned plies or within the cross-section described may also be provided without departing from the present disclosure.

Various embodiments of the present disclosure may be described herein with reference to flowchart illustrations and/or block diagrams of methods, apparatus (systems), and computer program products. Although a flowchart or block diagram may illustrate a method as comprising sequential steps or a process as having a particular order of operations, many of the steps or operations in the flowchart(s) or block diagram(s) illustrated herein can be performed in parallel or concurrently, and the flowchart(s) or block diagram(s) should be read in the context of the various embodiments of the present disclosure. In addition, the order of the method steps or process operations illustrated in a flowchart or block diagram may be rearranged for some embodiments. Similarly, a method or process illustrated in a flow chart or block diagram could have additional steps or operations not included therein or fewer steps or operations than those shown. Moreover, a method step may correspond to a method, a function, a procedure, a subroutine, a subprogram, etc.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

Additionally, as used herein, the phrase "at least one of [X] and [Y]," where X and Y are different components that may be included in an embodiment of the present disclosure, means that the embodiment could include component X without component Y, the embodiment could include the component Y without component X, or the embodiment could include both components X and Y. Similarly, when used with respect to three or more components, such as "at least one of [X], [Y], and [Z]," the phrase means that the embodiment could include any one of the three or more components, any combination or sub-combination of any of the components, or all of the components.

In the foregoing description various embodiments of the present disclosure have been presented for the purpose of illustration and description. They are not intended to be exhaustive or to limit the present disclosure to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A glass laminate, comprising:
   a first ply of 3D formed glass with a first thickness, a first strength, and a first coefficient of thermal expansion, wherein the first ply is hot-formed to exhibit a curved shape;
   a second ply of 3D formed glass with a second thickness less than the first thickness, a second strength greater than the first strength, and a second coefficient of thermal expansion selected to be sufficiently higher than the first coefficient of thermal expansion to induce residual compressive stresses in the first ply due to cold forming therewith; and
   an adhesive arranged between the first ply and the second ply, wherein the second ply is flat prior to the cold forming and pressed against a curved surface of the first ply with the adhesive to place the second ply in an elastically bent state, wherein the glass laminate exhibits a depth of bend from 5 mm to 210 mm.

2. The glass laminate of claim 1, wherein the residual compressive stresses range from approximately 10 MPa to approximately 25 MPa.

3. The glass laminate of claim 1, wherein the first coefficient of thermal expansion ranges from approximately 5 ppm/° C. to approximately 10 ppm/° C.

4. The glass laminate of claim 3, wherein the first coefficient of thermal expansion is approximately 8.5 ppm/° C.

5. The glass laminate of claim 3, wherein the second coefficient of thermal expansion ranges from approximately 7 ppm/° C. to approximately 30 ppm/° C.

6. The glass laminate of claim 5, wherein the second coefficient of thermal expansion ranges from approximately 10 ppm/° C. to approximately 20 ppm/° C.

7. The glass laminate of claim 6, wherein the second coefficient of thermal expansion is approximately 15 ppm/° C.

8. The glass laminate of claim 1, wherein the first ply is soda lime glass and the second ply is at least one of chemically strengthened glass, thermally strengthened glass, or mechanically strengthened glass.

9. The glass laminate of claim 1, wherein the glass laminate is configured as at least one of a roof or a windshield for a vehicle.

* * * * *